(12) United States Patent
Lundvall et al.

(10) Patent No.: US 7,356,710 B2
(45) Date of Patent: Apr. 8, 2008

(54) SECURITY MESSAGE AUTHENTICATION CONTROL INSTRUCTION

(75) Inventors: Shawn D. Lundvall, Poughkeepsie, NY (US); Ronald M. Smith, Sr., Wappingers Falls, NY (US); Phil Chi-Chung Yeh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 10/435,910

(22) Filed: May 12, 2003

(65) Prior Publication Data

US 2004/0230796 A1    Nov. 18, 2004

(51) Int. Cl.
G06F 11/30 (2006.01)
G06F 15/00 (2006.01)
H04L 9/00 (2006.01)
H04N 7/167 (2006.01)

(52) U.S. Cl. ............ 713/193; 713/181; 380/225; 712/2; 712/8

(58) Field of Classification Search ........... 713/193, 713/181; 712/2, 8; 380/225
See application file for complete search history.

(56) References Cited

U.S. PATENT DOCUMENTS

| | | | |
|---|---|---|---|
| 4,578,530 A | 3/1986 | Zeidler | 178/22.09 |
| 4,829,424 A | 5/1989 | Lee | |
| 5,666,411 A | 9/1997 | McCarty | 380/4 |
| 5,765,030 A * | 6/1998 | Nachenberg et al. | 714/33 |
| 5,787,302 A | 7/1998 | Hampapuram et al. | 395/800.24 |
| 6,542,981 B1 * | 4/2003 | Zaidi et al. | 712/2 |
| 6,996,725 B2 * | 2/2006 | Ma et al. | 726/22 |
| 2001/0029577 A1 | 10/2001 | Worrell et al. | 712/210 |
| 2002/0184046 A1 * | 12/2002 | Kamada et al. | 705/1 |
| 2002/0191790 A1 * | 12/2002 | Anand et al. | 380/255 |
| 2003/0028765 A1 | 2/2003 | Cromer et al. | 713/164 |

FOREIGN PATENT DOCUMENTS

| | | |
|---|---|---|
| EP | 0354774 A2 | 8/1989 |
| EP | 9725511 A2 | 1/1996 |
| JP | 56149645 A * | 11/1981 |

(Continued)

OTHER PUBLICATIONS

IBM PCI Cryptographic Coprocessor CCA BAsic Services Reference and Guide for IBM 4758 Models 002 and 023 with Release 2.40, Sep. 2001, http://www.zone-h.org/files/33/CCA_Basic_Services_240.pdf; pp. 1-1 through 2-18; 6-1 through 6-16; 7-1 through 7-24; B-1 through B-42; F-1 through F-4.

(Continued)

Primary Examiner—Emmanuel L. Moise
Assistant Examiner—Techane J. Gergiso
(74) Attorney, Agent, or Firm—John E. Campbell (57) ABSTRACT

A method, system and computer program product for computing a message authentication code for data in storage of a computing environment. An instruction specifies a unit of storage for which an authentication code is to be computed. An computing operation computes an authentication code for the unit of storage. A register is used for providing a cryptographic key for use in the computing to the authentication code. Further, the register may be used in a chaining operation.

32 Claims, 7 Drawing Sheets

FOREIGN PATENT DOCUMENTS

WO     WO 01/11818 A2     8/1999

OTHER PUBLICATIONS

"CryptoManiac: A Fast Flexible Architecture for Secure Communication", Wu et al., Proceedings of the 28th International Symposium on Computer Architecture, 2001.

"The Microarchitecture of the IBM eServer z900 Processor" E. Schwarz et al, IBM J. Res. & Dev. vol. 46, No. 4/5, Jul./Sep. 2002, pp. 381-395.

Unpublished IBM document describing IBM Prior Art.

'Computer Architecture and Organization', 2nd Edition, John F. Hayes, McGraw-Hill Book Company, pp. 52-54; 198-201.

* cited by examiner

FIG. 4
Prior Art $C = A \text{ XOR } B$

| | |
|---|---|
| 0 | CHAINING VALUE (CV) |
| 8 | CRYPTOGRAPHIC KEY 1 (K1) |
| 16 | CRYPTOGRAPHIC KEY 2 (K2) |
| 24 | CRYPTOGRAPHIC KEY 3 (K3) |

1.–6. EXCEPTIONS WITH THE SAME PRIORITY AS THE PRIORITY OF PROGRAM–INTERRUPTION CONDITIONS FOR THE GENERAL CASE.

7.A  ACCESS EXCEPTIONS FOR SECOND INSTRUCTION HALFWORD.

7.B  OPERATION EXCEPTION.

8.   SPECIFICATION EXCEPTION DUE TO INVALID FUNCTION CODE OR INVALID REGISTER NUMBER.

9.   SPECIFICATION EXCEPTION DUE TO INVALID OPERAND LENGTH.

10.  CONDITION CODE 0 DUE TO SECOND–OPERAND LENGTH ORIGINALLY ZERO.

11.  ACCESS EXCEPTIONS FOR AN ACCESS TO THE PARAMETER BLOCK OR SECOND OPERAND.

12.  CONDITION CODE 0 DUE TO NORMAL COMPLETION (SECOND–OPERAND LENGTH ORIGINALLY NONZERO, BUT STEPPED TO ZERO).

13.  CONDITION CODE 3 DUE TO PARTIAL COMPLETION (SECOND–OPERAND LENGTH STILL NONZERO).

SECURITY MESSAGE AUTHENTICATION CONTROL INSTRUCTION

BACKGROUND OF THE INVENTION

This invention relates to computer system architecture and particularly to new instructions which augment the IBM z/Architecture and can be emulated by other architectures.

Before our invention IBM has created through the work of many highly talented engineers beginning with machines known as the IBM System 360 in the 1960s to the present, a special architecture which, because of its essential nature to a computing system, became known as "the mainframe" whose principles of operation state the architecture of the machine by describing the machine instructions which may be executed upon the "mainframe" implementation of the machine instructions which had been invented by IBM inventors and adopted, because of their significant contribution to improving the state of the computing machine represented by "the mainframe", as significant contributions by inclusion in IBM's Principles of Operation as stated over the years. The First Edition of the *z/Architecture Principles of Operation* which was published December, 2000 has become the standard published reference as SA22-7832-00. We determined that further new instructions would assist the art and could be included in a z/Architecture machine and also emulated by others in simpler machines, as described herein.

BRIEF SUMMARY OF THE INVENTION

It is an object of the present invention to provide a CPU-synchronous, problem-state, and sectioning instruction for computing a message authentication code for data in storage of a computer system.

It is a further object of the invention to provide an instruction for computing a message authentication code using a cryptographic key in the computing of the message authentication code.

It is a further object of the invention to provide an instruction for computing a message authentication code using a chaining value for a chaining operation for computing message authentication codes for data in a plurality of storage locations.

BRIEF DESCRIPTION OF THE SEVERAL VIEWS OF THE DRAWING

These and other objects will be apparent to one skilled in the art from the following detailed description of the invention taken in conjunction with the accompanying drawings in which.

DETAILED DESCRIPTION OF THE INVENTION

The COMPUTE MESSAGE AUTHENTICATION CODE (KMAC) instruction will be discussed first, and then a preferred computer system, and, in the alternative, a computer system for emulating a computer system haveing a different architecture for executing the instrutcion.

Compute Message Authentication Code (KMAC)

Figure 1:
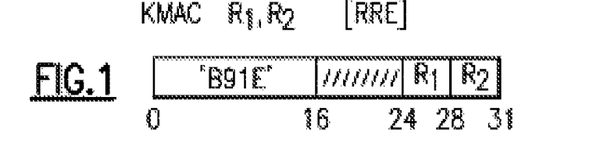
FIG. 1 is an illustration of the Compute Message Authentication Code (KMAC) instruction in the RRE instruction format.

FIG. 1 is an illustration of the Compute Message Authentication Code (KMAC) instruction in the RRE instruction format.

A function specified by the function code in general register 0 is performed. Bits 16-23 of the instruction and the R1 field are ignored.

Figure 2:
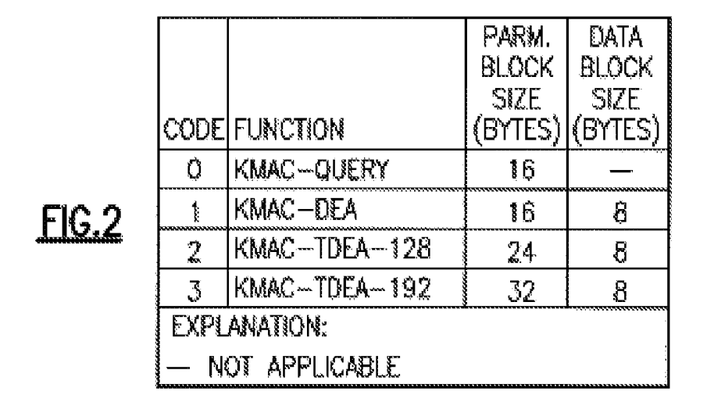
FIG. 2 is a table showing the function codes for the KMAC instruction of FIG. 1.

Bit positions 57-63 of general register 0 contain the function code. FIG. 2 shows the assigned function codes. All other function codes are unassigned. Bit 56 of general register 0 must be zero; otherwise, a specification exception is recognized. All other bits of general register 0 are ignored.

General register 1 contains the logical address of the leftmost byte of the parameter block in storage. In the 24-bit addressing mode, the contents of bit positions 40-63 of general register 1 constitute the address, and the contents of bit positions 0-39 are ignored. In the 31-bit addressing mode, the contents of bit positions 33-63 of general register 1 constitute the address, and the contents of bit positions 0-32 are ignored.

In the 64-bit addressing mode, the contents of bit positions 0-63 of general register 1 constitute the address.

The function codes for COMPUTE MESSAGE AUTHENTICATION CODE are shown in FIG. 2.

All other function codes are unassigned. The query function provides the means of indicating the availability of the other functions. The contents of general registers R2 and R2+1 are ignored.

For all other functions, the second operand is processed as specified by the function code using an initial chaining value in the parameter block and the result replaces the chaining value. The operation also uses a cryptographic key in the parameter block. The operation proceeds until the end of the second-operand location is reached or a CPU-determined number of bytes have been processed, whichever occurs first. The result is indicated in the condition code.

The R2 field designates an even-odd pair of general registers and must designate an even numbered register; otherwise, a specification exception is recognized.

The location of the leftmost byte of the second operand is specified by the contents of the R2 general register. The number of bytes in the second-operand location is specified in general register R2+1.

As part of the operation, the address in general register R2 is incremented by the number of bytes processed from the second operand, and the length in general register R2+1 is decremented by the same number. The formation and updating of the address and length is dependent on the addressing mode.

In the 24-bit addressing mode, the contents of bit positions 40-63 of general register R2 constitute the address of second operand, and are ignored; bits 40-63 of the updated address replace the corresponding bits in general register R_, carries out of bit position 40 of the updated address are ignored and, the contents of bit positions 32-39 of general register R_ are set to zeros. In the 31-bit addressing mode, the contents of bit positions 33-63 of general register R_ constitute the address of second operand, and the contents of bit positions 0-32 are ignored; bits 33-63 of the updated address replace the corresponding bits in general register R_, carries out of bit position 33 of the updated address are ignored, and the content of bit position 32 of general register R_ is set to zero. In the 64-bit addressing mode, the contents of bit positions 0-63 of general register R_ constitute the address of second operand; bits 0-63 of the updated address replace the contents of general register R_ and carries out of bit position 0 are ignored.

In both the 24-bit and the 31-bit addressing modes, the contents of bit positions 32-63 of general register R2+1 form a 32-bit unsigned binary integer which specifies the number of bytes in the second operand; and the updated value replaces the contents of bit positions 32-63 of general register R2+1. In the 64-bit addressing mode, the contents of bit position 0-63 of general register R2+1 form a 64-bit unsigned binary integer which specifies the number of bytes in the second operand; and the updated value replaces the contents of general register R2+1.

In the 24-bit or 31-bit addressing mode, the contents of bit positions 0-31 of general registers R2 and R2+1, always remain unchanged.

Figure 3:
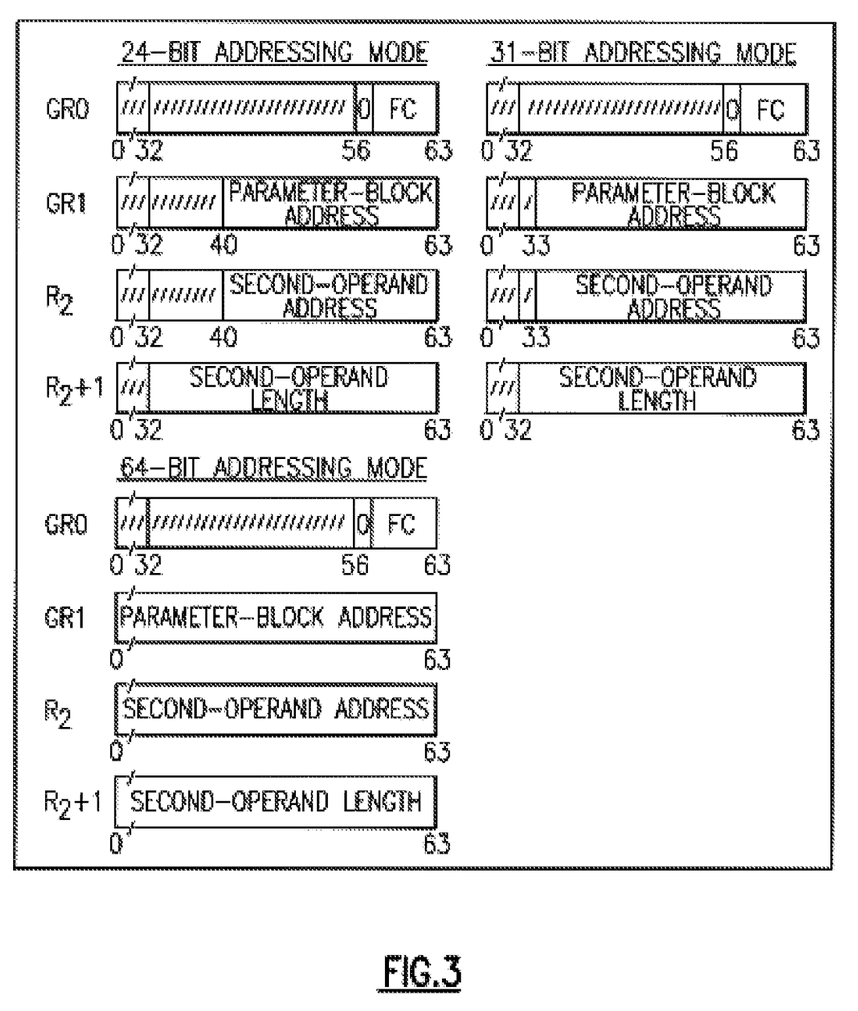
FIG. 3 is an illustration of the general register assignment for the KMAC instruction of FIG. 1.

FIG. 3 shows the contents of the general registers just described.

In the access-register mode, access registers 1 and R2 specify the address spaces containing the parameter block and second operand, respectively.

The result is obtained as if processing starts at the left end of the second operand and proceeds to the right, block by block. The operation is ended when all source bytes in the second operand have been processed (called normal completion), or when a CPU-determined number of blocks that is less than the length of the second operand have been processed (called partial completion). The CPU-determined number of blocks depends on the model, and may be a different number each time the instruction is executed. The CPU-determined number of blocks is usually nonzero. In certain unusual situations, this number may be zero, and condition code 3 may be set with no progress. However, the CPU protects against endless reoccurrence of this no-progress case.

When the chaining-value field overlaps any portion of the second operand, the result in the chaining value field is unpredictable.

Normal completion occurs when the number of bytes in the second operand as specified in general register R+1 have been processed.

When the operation ends due to normal completion, condition code 0 is set and the resulting value in R2+1 is zero. When the operation ends due to partial completion, condition code 3 is set and the resulting value in R2+1 is nonzero.

When the second-operand length is initially zero, the second operand and the parameter block are not accessed, general registers R2 and R2+1 are not changed, and condition code 0 is set.

As observed by other CPUs and channel programs, references to the parameter block and storage operands may be multiple-access references, accesses to these storage locations are not necessarily block-concurrent, and the sequence of these accesses or references is undefined.

Access exceptions may be reported for a larger portion of the second operand than is processed in a single execution of the instruction; however, access exceptions are not recognized for locations beyond the length of the second operand nor for locations more than 4K bytes beyond the current location being processed.

Symbols Used in Function Descriptions

Figure 4:
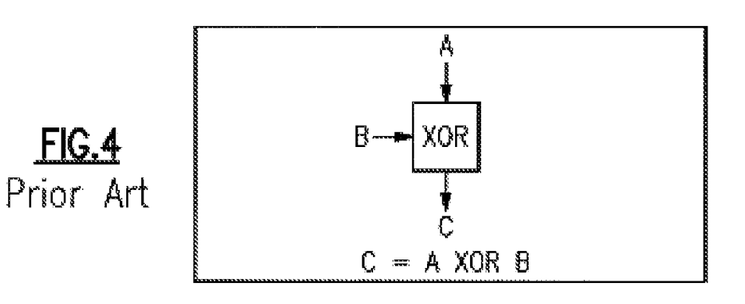
FIG. 4 illustrates the symbol used for Bit-Wise Exclusive Or according to prior art.
Figure 5:
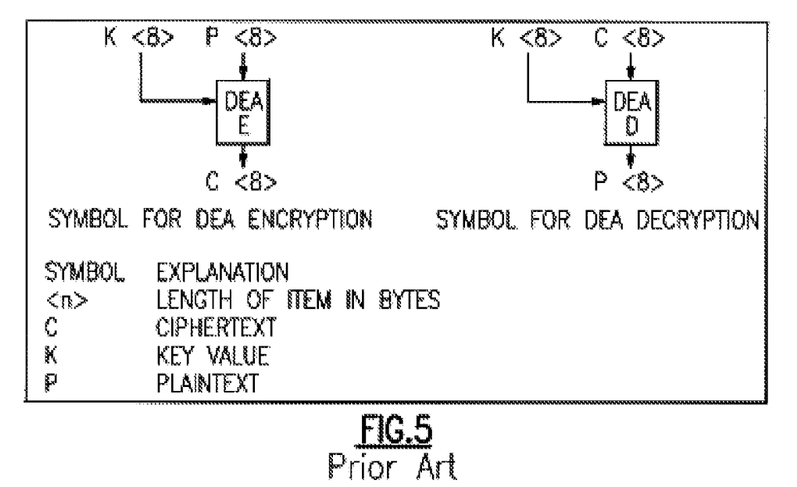
FIG. 5 illustrates symbol for DEA Encryption and Decryption according to prior art.

The symbols of FIGS. 4 and 5 are used in the subsequent description of the COMPUTE MESSAGE AUTHENTICATION CODE functions. For data-encryption-algorithm (DEA) functions, the DEA-key-parity bit in each byte of the DEA key is ignored, and the operation proceeds normally, regardless of the DEA-key parity of the key.

Further description of the data-encryption algorithm may be found in *Data Encryption Algorithm,* ANSI-X3.92.1981, American National Standard for Information Systems.

KMAC-Query (Function Code 0)

Figure 6:
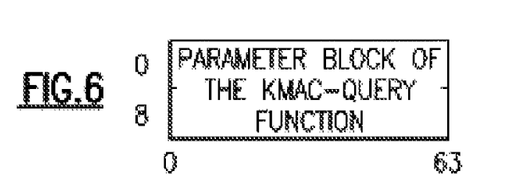
FIG. 6 illustrates the format for the parameter block for KMAC-Query.

The locations of the operands and addresses used by the instruction are as shown in FIG. 3. The parameter block used for the KMAC-Query function has the format shown in FIG. 6.

A 128-bit status word is stored in the parameter block. Bits 0-127 of this field correspond to function codes 0-127, respectively, of the KMAC instruction. When a bit is one, the corresponding function is installed; otherwise, the function is not installed.

Condition code 0 is set when execution of the KMAC-Query function completes; condition code 3 is not applicable to this function.

KMAC-DEA (Function Code 1)

The locations of the operands and addresses used by the instruction are as shown in FIG. 3.

Figure 7:
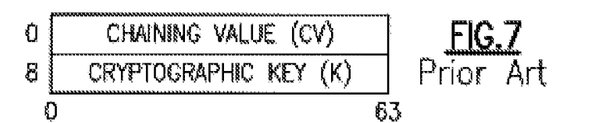
FIG. 7 illustrates the format for the parameter block for KMAC-DEA according to prior art.

The parameter block used for the KMAC-DEA function has the format shown in FIG. 7.

The message authentication code for the 8-byte message blocks (M1, M2, . . . , Mn) in operand 2 is computed using the DEA algorithm with the 64-bit cryptographic key and the 64-bit chaining value in the parameter block.

Figure 8:
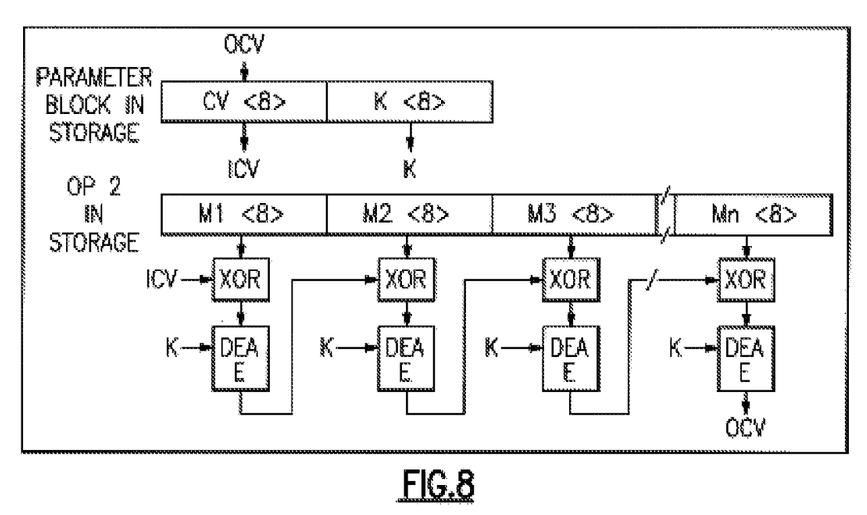
FIG. 8 illustrates the operation of KMAC-DEA.

The message authentication code, also called the output chaining value (OCV), is stored in the chaining-value field of the parameter block. The KMAC-DEA operation is shown in FIG. 8.

KMAC-TDEA-128 (Function Code 2)

The locations of the operands and addresses used by the instruction are as shown in FIG. 3.

Figure 9:
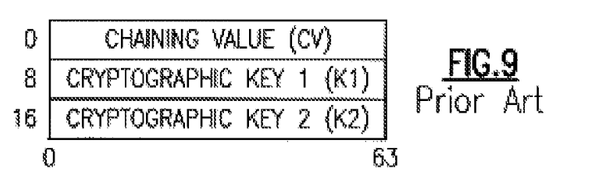
FIG. 9 illustrates the format for the parameter block for KMAC-TDEA-128 according to prior art.

The parameter block used for the KMAC-TDEA-128 function has the format shown in FIG. 9.

The message authentication code for the 8-byte message blocks (M1, M2, . . . , Mn) in operand 2 is computed using the TDEA algorithm with the two 64-bit cryptographic keys and the 64-bit chaining value in the parameter block.

Figure 10:
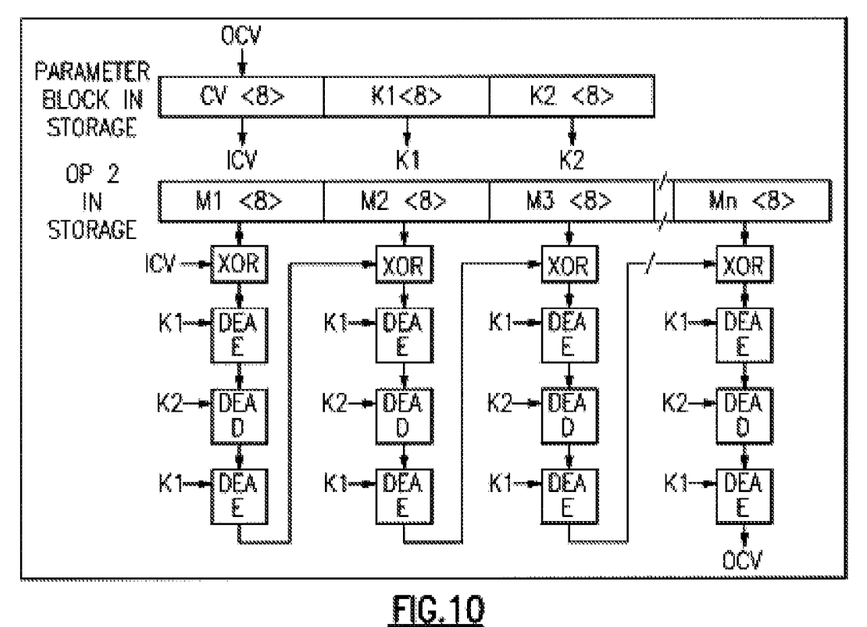
FIG. 10 illustrates the operation of KMAC-TDEA-128.

The message authentication code, also called the output chaining value (OCV), is stored in the chaining-value field of the parameter block. The KMAC-TDEA-128 operation is shown in FIG. 10.

KMAC-TDEA-192 (Function Code 3)

The locations of the operands and addresses used by the instruction are as shown in FIG. 3.

Figure 11:
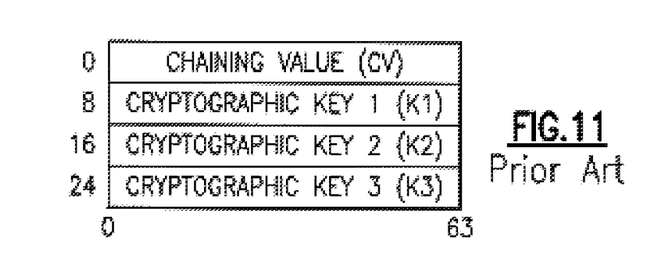
FIG. 11 illustrates the format for the parameter block for KMAC-TDEA-192 according to prior art.

The parameter block used for the KMAC-TDEA-192 function has the format shown in FIG. 11.

The message authentication code for the 8-byte message blocks (M1, M2, . . . , Mn) in operand 2 is computed using the TDEA algorithm with the three 64-bit cryptographic keys and the 64-bit chaining value in the parameter block.

Figure 12:
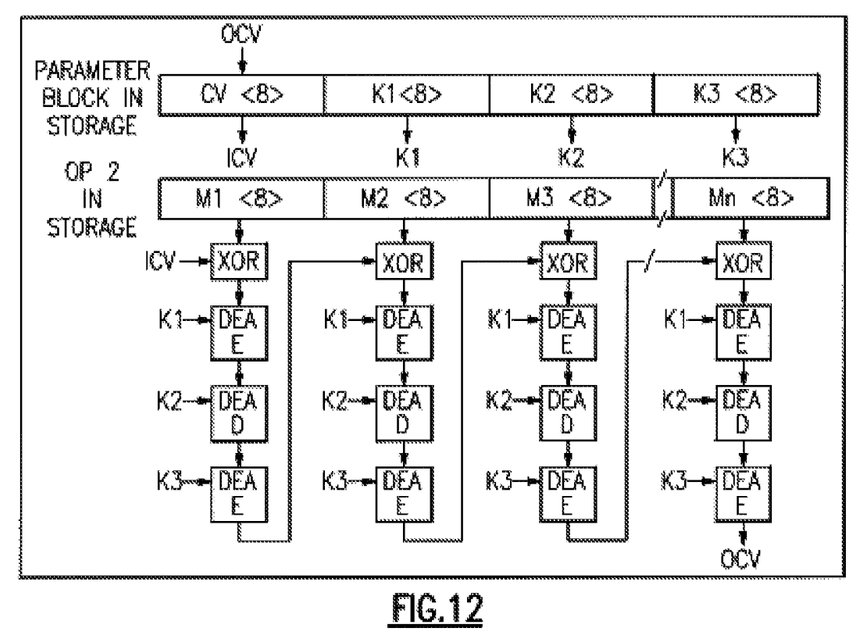
FIG. 12 illustrates the operation of KMAC-TDEA-192.
Figure 13:
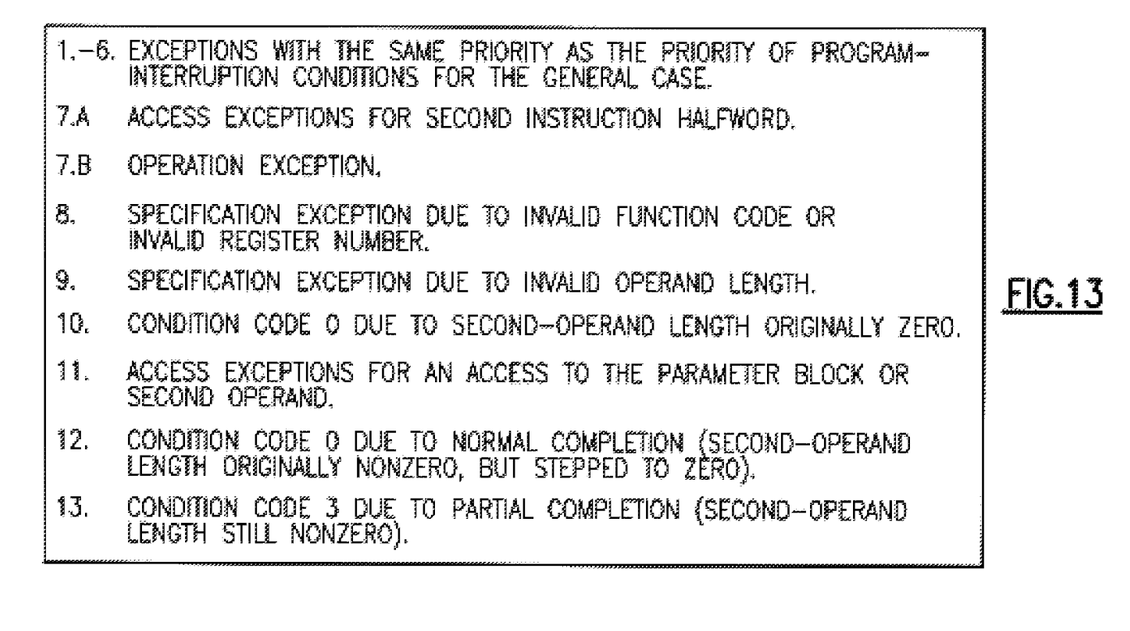
FIG. 13 is a table showing the priority of execution for KMAC.

The message authentication code, also called the output chaining value (OCV), is stored in the chaining-value field of the parameter block. The KMAC-TDEA-192 operation is shown in FIG. 12.

Special Conditions for KMAC

A specification exception is recognized and no other action is taken if any of the following occurs:
1. Bit 56 of general register 0 is not zero.
2. Bits 57-63 of general register 0 specify an unassigned or uninstalled function code.
3. The R_ field designates an odd-numbered register or general register 0.
4. The second-operand length is not a multiple of the data block size of the designated function (see FIG. 7-54 on page 7-92 to determine the data block size for COMPUTE MESSAGE AUTHENTICATION CODE functions).

Resulting Condition Code

0 Normal completion
1 —
2 —
3 Partial completion

Program Exceptions

Access (fetch, operand 2, cryptographic key; fetch and store, chaining value)
Operation (if the message-security assist is not installed)
Specification Programming Notes 1. Bit 56 of general register 0 is reserved for future extension and should be set to zero.
2. When condition code 3 is set, the second operand address and length in general registers R2 and R2+1, respectively, and the chaining-value in the parameter block are usually updated such that the program can simply branch back to the instruction to continue the operation. For unusual situations, the CPU protects against endless reoccurrence for the no-progress case. Thus, the program can safely branch back to the instruction whenever condition code 3 is set with no exposure to an endless loop.
3. If the length of the second operand is nonzero initially and condition code 0 is set, the registers are updated in the same manner as for condition code 3; the chaining value in this case is such that additional operands can be processed as if they were part of the same chain.
4. Before processing the first part of a message, the program must set the initial values for the chaining-value field. To comply with ANSI X9.9 or X9.19, the initial chaining value shall be set to all binary zeros.

Crypto Coprocessor

The preferred embodiment provides a crypto coprocessor which can be used with the instructions described herein and to execute cipher messages and assist in a variety of chaining message tasks which can be employed for chained and cryptographic use with the appropriate instructions.

Figure 14:
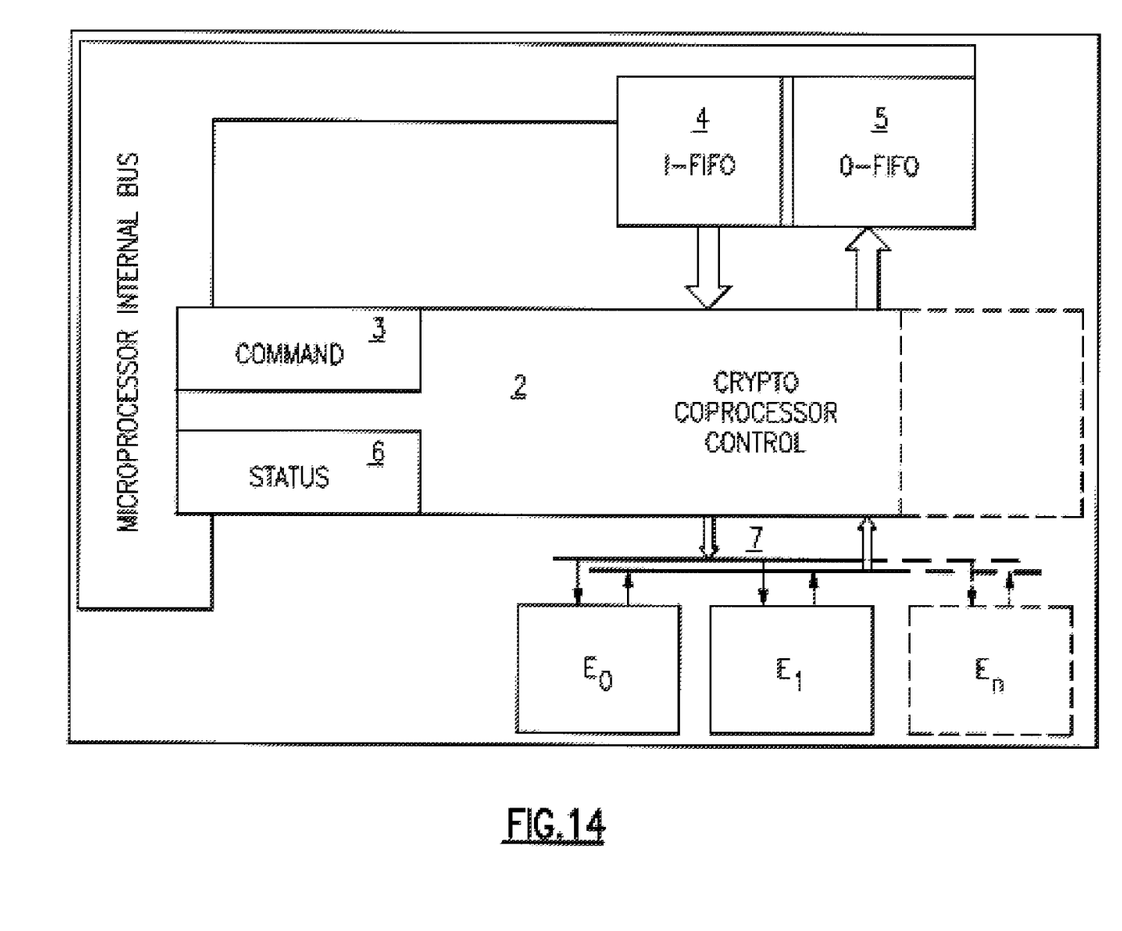
FIG. 14 illustrates our cryptographic coprocessor.

FIG. 14 illustrates our cryptographic coprocessor which is directly attached to a data path common to all internal execution units on the general purpose microprocessor, which has multiple execution pipelines. The microprocessor internal bus (1) is common to all other execution units is attached to the cryptographic control unit (2), and the control unit watches the bus for processor instructions that it should execute.

The cryptographic control unit provides a cryptographic coprocessor directly attached to a data path common to all internal execution units of the central processing unit on a general purpose microprocessor providing the available hardware ($E_0 \ldots E_n$), or from a combination thereof in the preferred embodiment having multiple execution pipelines) for the central processing unit. When a cryptographic instruction is encountered in the command register (3), the control unit (2) invokes the appropriate algorithm from the available hardware. Operand data is delivered over the same internal microprocessor bus via an input FIFO register (4). When an operation is completed the a flag is set in a status register (6) and the results are available to be read out from the output FIFO register (5).

The illustrated preferred embodiment of our invention is designed to be extensible to include as many hardware engines as required by a particular implementation depending on the performance goals of the system. The data paths to the input and output registers (7) are common among all engines.

The preferred embodiment of the invention cryptographic functions are implemented in execution unit hardware on the CPU and this implementation enables a lower latency for calling and executing encryption operations and increases the efficiency.

This decreased latency greatly enhances the capability of general purpose processes in systems that frequently do many encryption operations, particularly when only small amounts of data are involved. This allows an implementation that can significantly accelerate the processes involved in doing secure online transactions. The most common methods of securing online transactions involve a set of three algorithms. The first algorithm is only used one time in a session, and may be implemented in hardware or software, while the other operations are invoked with every transaction of the session, and the cost in latency of calling external hardware as well as the cost in time to execute the algorithm in software are both eliminated with this invention.

Figure 15:
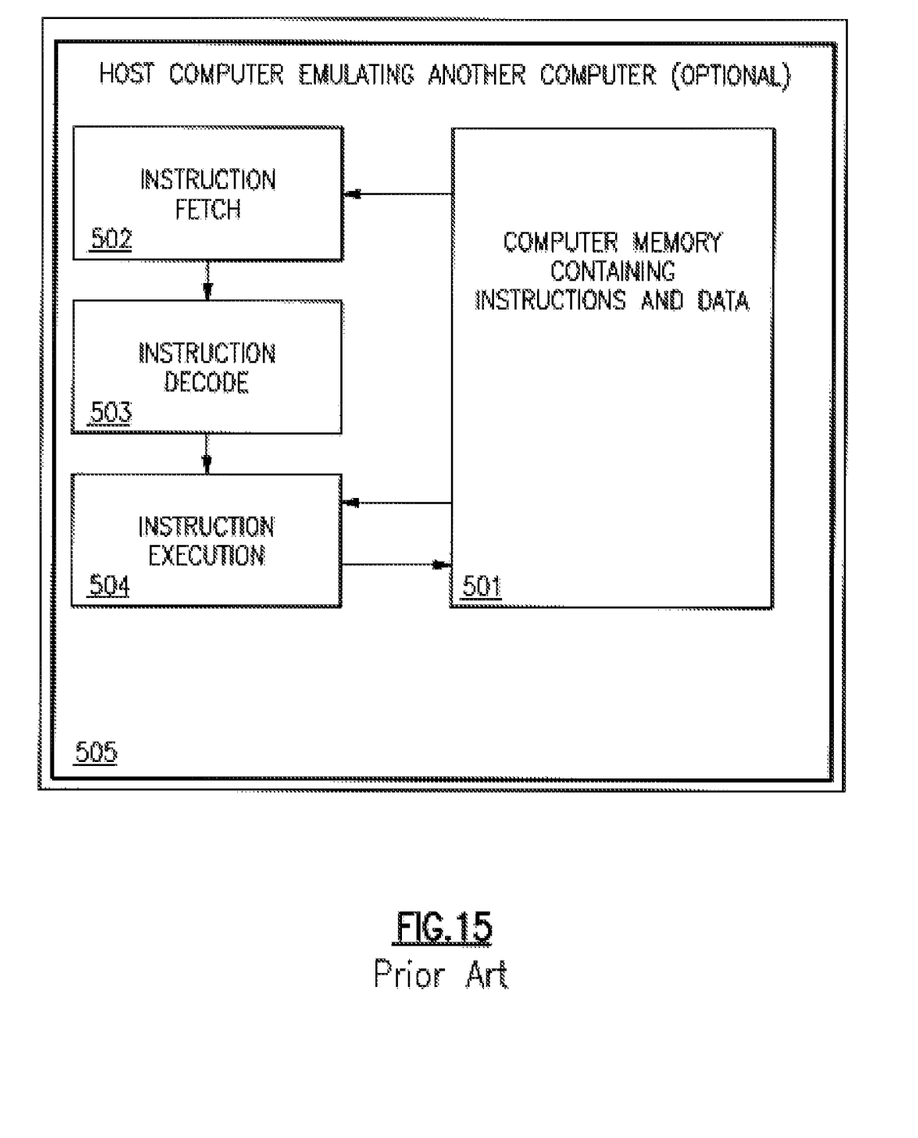
FIG. 15 shows the prior art generalized preferred embodiment of a computer memory storage containing instructions in accordance with the preferred embodiment and data, as well as the mechanism for fetching, decoding and executing these instructions, either on a computer system employing these architected instructions or as used in emulation of our architected instructions.

In FIG. 15 we have shown conceptually how to implement what we have in a preferred embodiment implemented in a mainframe computer having the microprocessor described above which can effectively be used, as we have experimentally proven within IBM, in a commercial implementation of the long displacement facility computer architected instruction format the instructions are used by programmers, usually today "C" programmers. These instruction formats stored in the storage medium may be executed natively in a Z/Architecture IBM Server, or alternatively in machines executing other architectures. They can be emulated in the existing and in future IBM mainframe servers and on other machines of IBM (e.g. pSeries Servers and xSeries Servers). They can be executed in machines running Linux on a wide variety of machines using hardware manufactured by IBM, Intel, AMD, Sun Microsystems and others. Besides execution on that hardware under a Z/Architecture, Linux can be used as well as machines which use emulation by Hercules, UMX, FXI or Platform Solutions, where generally execution is in an emulation mode. In emulation mode the specific instruction being emulated is decoded, and a subroutine built to implement the individual instruction, as in a "C" subroutine or driver, or some other method of providing a driver for the specific hardware as is within the skill of those in the art after understanding the description of the preferred embodiment. Various software and hardware emulation patents including, but not limited to U.S. Pat. No. 5,551,013 for a "Multiprocessor for hardware emulation" of Beausoleil et al., and U.S. Pat. No. 6,009,261: Preprocessing of stored target routines for emulating incompatible instructions on a target processor" of Scalzi et al; and U.S. Pat. No. 5,574,873: Decoding guest instruction to directly access emulation routines that emulate the guest instructions, of Davidian et al.; U.S. Pat. No. 6,308,255: Symmetrical multiprocessing bus and chipset used for coprocessor support allowing non-native code to run in a system, of Gorishek et al; and U.S. Pat. No. 6,463,582: Dynamic optimizing object code translator for architecture emulation and dynamic optimizing object code translation method of Lethin et al.; and U.S. Pat. No. 5,790,825: Method for emulating guest instructions on a host computer through dynamic recompilation of host instructions of Eric Traut; and many others, illustrate the a variety of known ways to achieve emulation of an instruction format architected for a different machine for a target machine available to those skilled in the art, as well as those commercial software techniques used by those referenced above.

As illustrated by FIG. 15, these instructions are executed in hardware by a processor or by emulation of said instruction set by software executing on a computer having a different native instruction set.

In FIG. 15, #501 shows a computer memory storage containing instructions and data. The instructions described in this invention would initially stored in this computer. #502 shows a mechanism for fetching instructions from a computer memory and may also contain local buffering of these instructions it has fetched. Then the raw instructions are transferred to an instruction decoder, #503, where it determines what type of instruction has been fetched. #504, shows a mechanism for executing instructions. This may include loading data into a register from memory, #501, storing data back to memory from a register, or performing some type of arithmetic or logical operation. This exact type of operation to be performed has been previously determined by the machine instruction decoder. The instructions described in this invention would be executed here. If the instructions are being executed natively on a computer system, then this diagram is complete as described above. However, if an instruction set architecture, is being emulated on another computer, the above process would be implemented in software on a host computer, #505. In this case, the above stated mechanisms would typically be implemented as one or more software subroutines within the emulator software. In both cases an instruction is fetched, decoded and executed.

More particularly, these architected instructions can be used with a computer architecture with existing instruction formats with a 12 bit unsigned displacement used to form the operand storage address and also one having additional instruction formats that provide a additional displacement bits, preferably 20 bits, which comprise an extended signed displacement used to form the operand storage address. These computer architected instructions comprise computer software, stored in a computer storage medium, for producing the code running of the processor utilizing the computer software, and comprising the instruction code for use by a compiler or emulator/interpreter which is stored in a computer storage medium 501, and wherein the first part of the instruction code comprises an operation code which specified the operation to be performed and a second part which designates the operands for that participate. The long displacement instructions permit additional addresses to be directly addressed with the use of the long displacement facility instruction.

As illustrated by FIG. 15, these instructions are executed in hardware by a processor or by emulation of said instruction set by software executing on a computer having a different native instruction set.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for computing a message authentication code in a computer system, the method comprising the steps of:

fetching a message authentication code instruction, the message authentication code instruction comprising a query function, the computer system comprising a plurality of general registers, a computer memory and one or more execution units, the execution units executing instructions fetched from computer memory;

responsive to fetching the message authentication code instruction, determining from a previously defined function code selected from a plurality of function codes, a message authentication code operation to be executed, the previously defined function code defining any one of a message authentication code generation operation or a function query operation to be executed, wherein the plurality of function codes comprises an indication of any one of a query operation, a DEA 64-bit key cryptographic operation, a triple DEA two 64-bit key cryptographic operation or a triple DEA three 64-bit key cryptographic operation;

if the determined message authentication code operation to be executed is a message authentication code generation operation, performing the message authentication code generation operation on an operand comprising the steps a) through b) of:

a) computing a message authentication code for an operand using one or more cryptographic user keys and a 8 byte chaining value, the operand comprising one or more 8-byte message blocks, the computing step producing a new 8 byte chaining value; and b) storing the produced new 8 byte chaining value;

if the determined message authentication code operation to be executed is a function query operation, performing the function query operation comprising steps i) through j) of:

i) determining for each of one or more message authentication functions whether the message authentication function is installed on the computer system for execution by a message authentication code instruction; and j) responsive to the determining step, saving a status word in a parameter block in memory, the parameter block having an address specified by a general register of a plurality of general registers, the status word comprising one or more status word bits, each status word bit having a one-to-one correspondence with a unique one of said one or more message authentication functions, each status word bit indicating whether the corresponding message authentication function is installed on the computer system.

2. The method according to claim 1, wherein step a) computing a message authentication code comprises the further steps x1)-x6) of:
   x1) obtaining the one or more cryptographic user keys;
   x2) obtaining an 8 byte chaining value;
   x3) obtaining an 8 byte message block of the operand;
   x4) exclusive ORing the chaining value with the 8 byte message block of the operand;
   x5) using the cryptographic user keys obtained, directly enciphering the result of the exclusive ORing step by direct application of the obtained cryptographic keys to the result of the exclusive ORing step to produce a new 8 byte chaining value; and
   x6) repeating steps x3)-x5) for successive 8 byte message blocks of the operand, using the new chaining value produced in step x5) for a previous message block as a chaining value in step x2) for a subsequent message block.

3. The method according to claim 2, wherein the obtained one or more cryptographic user keys consists of any one of a 64 bit encryption key, two 64 bit encryption keys or three 64 bit encryption keys.

4. The method according to claim 1, wherein the message authentication code instruction comprises:
   an opcode field;
   a register field, the register field specifying a register pair consisting of first general register and a second general register of the plurality of general registers, wherein the first general register contains an address of the operand, wherein the second general register specifies a length of the operand, wherein further the previously defined function code is obtained from a predetermined general register of the plurality of general registers; and
   wherein a predetermined general register of the plurality of general registers contains an address of a parameter block in storage, the parameter block comprising the one or more cryptographic user keys, the parameter block further comprising an 8 byte chaining value.

5. The method according to claim 4, wherein the predetermined general register of the plurality of general registers having the previously defined function code is general register 0 and wherein the predetermined general register of the plurality of general registers having the address of the parameter block in storage comprising the one or more cryptographic user keys and the 8 byte chaining value is general register 1.

6. The method according to claim 4, comprising the further steps of:
   incrementing the address of the operand contained in the first general register according to the number of bytes processed in the steps performed; and
   decrementing the length of the operand contained in the second general register according to the number of bytes processed in the steps performed.

7. The method according to claim 2, wherein the one or more cryptographic user keys consists of any one of 8 bytes, 16 bytes or 24 bytes.

8. The method according to claim 1, comprising the further steps of:
   if the performing the message authentication code generation operation step has been performed on only a portion of the operand, setting a partial completion condition code value as a condition code, the partial completion condition code value indicating that the performing the message authentication code generation operation step is incomplete; and
   if the performing the message authentication code generation operation step has been performed on all of the operand, setting a normal completion condition code value as a condition code, the normal completion condition code value indicating that the performing the message authentication code generation operation step is complete.

9. The method according to claim 1, wherein the computer system comprises a microprocessor, the microprocessor having an instruction architecture and wherein the message authentication code instruction is native to said instruction architecture of the microprocessor.

10. The method according to claim 1, wherein the computer system comprises a microprocessor, the microprocessor having an instruction architecture and the message authentication code instruction is not native to said instruction architecture, the method comprising the further steps of:
   interpreting the message authentication code instruction to identify a predetermined software routine for emulating the operation of the message authentication code instruction, the predetermined software routine comprising a plurality of instructions; and
   executing the predetermined software routine.

11. A computer program product for computing a message authentication code instruction in a computer system, the computer program product comprising:
   a storage medium readable by a processing circuit and storing instructions for execution by the processing circuit for performing a method comprising:
   fetching a message authentication code instruction, the message authentication code instruction comprising a query function, the computer system comprising a plurality of general registers, a computer memory and one or more execution units, the execution units executing instructions fetched from computer memory;
   responsive to fetching the message authentication code instruction, determining from a previously defined function code selected from a plurality of function codes, a message authentication code operation to be executed, the previously defined function code defining any one of a message authentication code generation operation or a function query operation to be executed, wherein the plurality of function codes comprises an indication of any one of a query operation, a DEA 64-bit key cryptographic operation, a triple DEA two 64-bit key cryptographic operation or a triple DEA three 64-bit key cryptographic operation;
   if the determined message authentication code operation to be executed is a message authentication code generation operation, performing the message authentication code generation operation on an operand comprising the steps a) through b) of:
   a) computing a message authentication code for an operand using one or more cryptographic user keys and a 8 byte chaining value, the operand comprising one or more 8-byte message blocks, the computing step producing a new 8 byte chaining value; and
   b) storing the produced new 8 byte chaining value;
   if the determined message authentication code operation to be executed is a function query operation, performing the function query operation comprising steps i) through j) of:

i) determining for each of one or more message authentication functions whether the message authentication function is installed on the computer system for execution by a message authentication code instruction; and j) responsive to the determining step, saving a status word in a parameter block in memory, the parameter block having an address specified by a general register of a plurality of general registers, the status word comprising one or more status word bits, each status word bit having a one-to-one correspondence with a unique one of said one or more message authentication functions, each status word bit indicating whether the corresponding message authentication function is installed on the computer system.

12. The computer program product according to claim 11, wherein step a) computing a message authenticating code comprises the further steps x1)-X6) of:

x1) obtaining the one or more cryptographic user keys;

x2) obtaining an 8 byte chaining value;

x3) obtaining an 8 byte message block of the operand;

x4) exclusive ORing the chaining value with the 8 byte message block of the operand;

x5) using the cryptographic user keys obtained, directly enciphering the result of the exclusive ORing step by direct application of the obtained cryptographic keys to the result of the exclusive ORing step to produce a new 8 byte chaining value; and x6) repeating steps x3)-x5) for successive 8 byte message blocks of the operand, using the new chaining value produced in step x5) for a previous message block as a chaining value in step x2) for a subsequent message block.

13. The computer program product according to claim 12, wherein the one or more cryptographic user keys consists of any one of 8 bytes, 16 bytes or 24 bytes.

14. The computer program product according to claim 12, wherein the obtained one or more cryptographic user keys consists of any one of a 64 bit encryption key, two 64 bit encryption keys or three 64 bit encryption keys.

15. The computer program product according to claim 11, wherein the message authentication code instruction comprises:

an opcode field;

a register field, the register field specifying a register pair consisting of first general register and a second general register of the plurality of general registers, wherein the first general register contains an address of the operand, wherein the second general register specifies a length of the operand, wherein further the previously defined function code is obtained from a predetermined general register of the plurality of general registers; and wherein a predetermined general register of the plurality of general registers contains an address of a parameter block in storage, the parameter block comprising the one or more cryptographic user keys, the parameter block further comprising an 8 byte chaining value.

16. The computer program product according to claim 15, wherein the predetermined general register of the plurality of general registers having the previously defined function code is general register 0 and wherein the predetermined general register of the plurality of general registers having the address of the parameter block in storage comprising the one or more cryptographic user keys and the 8 byte chaining value is general register 1.

17. The computer program product according to claim 15, comprising the further steps of:

incrementing the address of the operand contained in the first general register according to the number of bytes processed in the steps performed; and decrementing the length of the operand contained in the second general register according to the number of bytes processed in the steps performed.

18. The computer program product according to claim 11, comprising the further steps of:

if the performing the message authentication code generation operation step has been performed on only a portion of the operand, setting a partial completion condition code value as a condition code, the partial completion condition code value indicating that the performing the message authentication code generation operation step is incomplete; and if the performing the message authentication code generation operation step has been performed on all of the operand, setting a normal completion condition code value as a condition code, the normal completion condition code value indicating that the performing the message authentication code generation operation step is complete.

19. The complete program product according to claim 11, wherein the previously defined function code comprises an indication of any one of a KMAC-Query operation, a KMAC-DEA 64-bit key cryptographic operation, a KMAC-Triple DEA two 64-bit key cryptographic operation or a KMAC-Triple DEA three 64-bit key cryptographic operation.

20. The computer program product according to claim 11, wherein the computer system comprises a microprocessor, the microprocessor having an instruction architecture and wherein the message authentication code instruction is native to said instruction architecture of the microprocessor.

21. The computer program product according to claim 11, wherein the computer system comprises a microprocessor, the microprocessor having an instruction architecture and the message authentication code instruction is not native to said instruction architecture, the method comprising the further steps of:

interpreting the message authentication code instruction to identify a predetermined software routine for emulating the operation of the message authentication code instruction, the predetermined software routine comprising a plurality of instructions; and executing the predetermined software routine.

22. A system for computing a message authentication code instruction in a computer system, the message authentication code instruction comprising a query function, the system comprising:

a memory;

a computer system in communication with the memory, the computer system comprising:

a plurality of general registers, a general purpose microprocessor in communications with a computer memory and the general registers, the microprocessor comprising one or more execution units, the execution units executing instructions fetched from computer memory an instruction fetching unit for fetching instructions from memory and one or more execution units for executing fetched instructions;

wherein the computer system performs a method comprising:

fetching a message authentication code instruction, the message authentication code instruction comprising a query function, the computer system comprising a plurality of general registers, a computer memory and one or more execution units, the execution units executing instructions fetched from computer memory;

responsive to fetching the message authentication code instruction, determining from a previously defined function code selected from a plurality of function codes, a message authentication code operation to be executed, the previously defined function code defining any one of a message authentication code generation operation or a function query operation to be executed, wherein the plurality of function codes comprises an indication of any one of a query operation, a DEA 64-bit key cryptographic operation, a triple DEA two 64-bit key cryptographic operation or a triple DEA three 64-bit key cryptographic operation;

if the determined message authentication code operation to be executed is a message authentication code generation operation, performing the message authentication code generation operation on an operand comprising the steps a) through b) of:

a) computing a message authentication code for an operand using one or more cryptographic user keys and a 8 byte chaining value, the operand comprising one or more 8-byte message blocks, the computing step producing a new 8 byte chaining value; and b) storing the produced new 8 byte chaining value;

if the determined message authentication code operation to be executed is a function query operation, performing the function query operation comprising steps i) through j) of:

i) determining for each of one or more message authentication functions whether the message authentication function is installed on the computer system for execution by a message authentication code instruction; and j) responsive to the determining step, saving a status word in a parameter block in memory, the parameter block having an address specified by a general register of a plurality of general registers, the status word comprising one or more status word bits, each status work bit having a one-to-one correspondence with a unique one of said one or more message authentication functions, each status word bit indicating whether the corresponding message authentication function is installed on the computer system.

23. The system according to claim 22, wherein step a) computing a message authenticating code comprises the further steps x1)-x6) of:

x1) obtaining the one or more cryptographic user keys;

x2) obtaining an 8 byte chaining value;

x3) obtaining an 8 byte message block of the operand;

x4) exclusive ORing the chaining value with the 8 byte message block of the operand;

x5) using the cryptographic user keys obtained, directly enciphering the result of the exclusive ORing step by direct application of the obtained cryptographic keys to the result of the exclusive ORing step to produce a new 8 byte chaining value; and x6) repeating steps x3)-x5) for successive 8 byte message blocks of the operand, using the new chaining value produced in step x5) for a previous message block as a chaining value in step x2) for a subsequent message block.

24. The system according to claim 23, wherein the one or more cryptographic user keys consists of any one of 8 bytes, 16 bytes or 24 bytes.

25. The system according to claim 23, wherein the obtained one or more cryptographic user keys consists of any one of a 64 bit encryption key, two 64 bit encryption keys or three 64 bit encryption keys.

26. The system according to claim 22, wherein the message authentication code instruction comprises:

an opcode field;

a register field, the register field specifying a register pair consisting of first general register and a second general register of the plurality of general register, wherein the first general register contains an address of the operand, wherein the second general register specifies a length of the operand, wherein further the previously defined function code is obtained from a predetermined general register of the plurality of general registers; and wherein a predetermined general register of the plurality of general registers contains an address of a parameter block in storage, the parameter block comprising the one or more cryptographic user keys, the parameter block further comprising an 8 byte chaining value.

27. The system according to claim 26, wherein the predetermined general register having the previously defined function code is general register 0 and wherein the predetermined general register of the plurality of general registers having the address of a parameter block in storage is general register 1.

28. The system according to claim 26, comprising the further steps of:

incrementing the address of the operand contained in the first general register according to the number of bytes processed in the steps performed; and decrementing the length of the operand contained in the second general register according to the number of bytes processed in the steps performed.

29. The system according to claim 22, comprising the further steps of:

if the performing the message authentication code generation operation step has been performed on only a portion of the operand, setting a partial completion condition code value as a condition code, the partial completion condition code value indicating that the performing the message authentication code generation operation step is incomplete; and if the performing the message authentication code generation operation step has been performed on all of the operand, setting a normal completion condition code value as a condition code, the normal completion condition code value indicating that the performing the message authentication code generation operation step is complete.

30. The system according to claim 22, wherein the previously defined function code comprises an indication of any one of a KMAC-Query operation, a KMAC-DEA 64-bit key cryptographic operation, a KMAC-Triple DEA two 64-bit key cryptographic operation or a KMAC-Triple DEA three 64-bit key cryptographic operation.

31. The system according to claim 22, wherein the computer system comprises a microprocessor, the microprocessor having an instruction architecture and wherein the message authentication code instruction is native to said instruction architecture of the microprocessor.

32. The system according to claim 22, wherein the computer system comprises a microprocessor, the microprocessor having an instruction architecture and the message authentication code instruction is not native to said instruction architecture, the method comprising the further steps of:
  interpreting the message authentication code instruction to identify a predetermined software routing for emulating the operation of the message authentication code instruction, the predetermined software routine comprising a plurality of instructions; and
  executing the predetermined software routine.

* * * * *